(12) United States Patent
Sutherland (10) Patent No.: US 9,346,429 B2
(45) Date of Patent: May 24, 2016

(54) PASSENGER RESTRAINT PAWL AND RATCHET ASSEMBLY WITH POSITIVE ENGAGEMENT

(71) Applicant: DISNEY ENTERPRISES, INC., Burbank, CA (US)

(72) Inventor: Travis Howard Sutherland, Menifee, CA (US)

(73) Assignee: Disney Enterprises, Inc., Burbank, CA (US)

( * ) Notice: Subject to any disclaimer, the term of this patent is extended or adjusted under 35 U.S.C. 154(b) by 315 days.

(21) Appl. No.: 14/199,747

(22) Filed: Mar. 6, 2014

(65) Prior Publication Data
US 2015/0251619 A1   Sep. 10, 2015

(51) Int. Cl.
| | | |
|---|---|---|
| *B60R 21/02* | (2006.01) | |
| *A63G 31/00* | (2006.01) | |
| *B60R 21/00* | (2006.01) | |
| *B60R 22/00* | (2006.01) | |

(52) U.S. Cl.
CPC ............... *B60R 21/02* (2013.01); *A63G 31/00* (2013.01); *B60R 22/00* (2013.01); *B60R 2021/0097* (2013.01); *Y10T 74/2137* (2015.01)

(58) Field of Classification Search
CPC  B60R 21/02; B60R 22/00; B60R 2021/0097; Y10T 74/2136; Y10T 74/2137; Y10T 74/2138; A63G 31/00
USPC .................................................. 238/327 R
See application file for complete search history.

(56) References Cited

U.S. PATENT DOCUMENTS

| | | | |
|---|---|---|---|
| 2,822,726 A | | 2/1958 | Blum |
| 3,190,579 A | | 6/1965 | Spouge |
| 3,465,605 A | | 9/1969 | Hylan |
| 4,085,905 A | * | 4/1978 | Lindbald ............... B60R 22/343 242/384 |
| 4,130,028 A | * | 12/1978 | Solberg ................ A47C 20/045 160/302 |
| 4,159,084 A | * | 6/1979 | Mori ....................... B60R 22/36 242/378.1 |
| 4,409,865 A | | 10/1983 | Krautter et al. |
| 4,817,754 A | * | 4/1989 | Muramoto ............ B60R 22/023 180/268 |
| 4,834,425 A | * | 5/1989 | Kawai ..................... B60R 22/06 280/804 |
| 5,118,135 A | | 6/1992 | Yano |
| 5,299,830 A | * | 4/1994 | Hanna ................. B60R 22/1953 242/379.2 |
| 5,634,690 A | * | 6/1997 | Watanabe ........... B60R 22/1952 242/374 |
| 5,871,233 A | * | 2/1999 | Tanaka ................... B62D 1/197 280/777 |

(Continued)

*Primary Examiner* — Zachary Kuhfuss
(74) *Attorney, Agent, or Firm* — Marsh Fischmann & Breyfogle LLP; Kent A. Lembke (57) ABSTRACT

A passenger restraint system is provided for use in vehicles such as ride vehicles used in theme and amusement park rides. The restraint system includes a passenger restraint such as a lap bar, a belt, or an over-the-shoulder restraint includes a locking mechanism for selectively latching the restraint in a desired position. The locking mechanism includes a ratchet connected to the passenger restraint and mounted so as to rotate with movement of the passenger restraint. The locking mechanism also includes a pawl, which is a two piece assembly that includes: (1) a pivotally mounted upper portion; and (2) a pawl arm extending outward from the upper portion. In some embodiments, a first end of the pawl arm is pivotally coupled with the upper portion, and a second end of the pawl arm, distal to the second end, includes a tooth for engaging teeth on a surface of the ratchet.

11 Claims, 9 Drawing Sheets

(56) References Cited

U.S. PATENT DOCUMENTS

| | | | |
|---|---|---|---|
| 5,882,084 A * | 3/1999 | Verellen | B60R 22/40 242/384.4 |
| 5,884,972 A | 3/1999 | Deptolla | |
| 5,887,318 A | 3/1999 | Nicoletti | |
| 5,984,357 A * | 11/1999 | Yasuda | B60R 22/1955 280/806 |
| 6,175,994 B1 | 1/2001 | Nicoletti | |
| 7,159,520 B2 * | 1/2007 | Casey | B61G 5/02 104/63 |
| 7,902,472 B2 | 3/2011 | Godesa | |
| 8,033,945 B2 | 10/2011 | Patterson | |
| 8,128,306 B2 | 3/2012 | Gorzo | |
| 8,250,946 B2 | 8/2012 | Lesche | |
| 8,342,553 B2 | 1/2013 | Patterson | |
| 2007/0069060 A1 * | 3/2007 | Maciejczyk | B60R 22/347 242/381.1 |
| 2011/0089705 A1 | 4/2011 | Barth et al. | |
| 2013/0073148 A1 * | 3/2013 | Dolan | B60R 22/36 701/45 |

* cited by examiner

PASSENGER RESTRAINT PAWL AND RATCHET ASSEMBLY WITH POSITIVE ENGAGEMENT

BACKGROUND

1. Field of the Description

The present description relates, in general, to amusement park rides and passenger restraints with latching and locking mechanisms (such as ratchet and pawl assemblies) in such rides and other implementations, and, more particularly, to a ratchet and pawl assembly for use in latching and/or locking a passenger restraint, with the assembly adapted to provide improved, positive engagement between the pawl and the ratchet.

2. Relevant Background

Amusement parks continue to be popular worldwide with hundreds of millions of people visiting the parks each year. Park operators seek new designs for extreme or thrill rides that attract people to their parks, but safe operation of the new and existing rides is always a highest priority design requirement. For example, roller coasters and other thrill rides apply significant amounts of force (e.g., g-forces) on the passenger with numerous twists, turns, drops, and loops at speeds of up to 100 miles per hour or more. Ride designers or engineers are given the task of producing unique and more exciting rides that are safe and that are also less costly to operate and maintain.

Passenger restraints are one of the most important features in ride safety as these restraints comfortably and securely keep passengers in place in a seat or within a ride car or compartment. Ride engineers continue to evaluate new kinds of passenger restraint systems that meet safety requirements while being less expensive to operate and maintain. During operation of a ride, a passenger restraint is typically placed across the lap or over the shoulder of a ride passenger, and a mechanism is typically provided as part of the restraint that locks or latches the restraint in place during operation of the ride. Proper operation for passenger restraints includes the locking or latching mechanism properly engaging (sometimes labeled "positive engagement") to prevent the restraint from opening during the ride cycle.

Ratchets are convenient devices for ride designers to use in passenger restraint assemblies because they rotate in one direction but not in the other when a pawl engages teeth of the ratchet or the ratchet wheel. For example, an over-the-shoulder restraint may include a pawl and ratchet assembly to provide the latching and locking mechanism for the restraint. During operation, the passenger pulls the restraint down, and, during this motion, a spring or other actuator urges the pawl into engagement with the teeth of the nearby or adjacent ratchet. As a result, the passenger moves the restraint and the ratchet in one direction (e.g., downward), but the passenger and ride forces cannot push or move the restraint and the ratchet in the other direction because the pawl engages the ratchet teeth to stop motion in this direction. Pawl and ratchet assemblies are also relatively inexpensive to manufacture and maintain, and these and other characteristics make ratchets attractive for use in restraints and similar applications.

To be confident that the restraint will adequately prevent reverse motion when needed, a ride designer needs to design the pawl and ratchet assembly to ensure positive engagement. The design should be adapted to allow the pawl to move freely, as it passes over the teeth in the forward motion of the ratchet, and then into the valley or recessed surface between two adjacent teeth of a ratchet to engage the ratchet and to resist reverse motion if movement of the ratchet is attempted in this second or reverse motion.

Passenger restraints of all kind may be designed to include pawl and ratchet assemblies and exemplary passenger restraints include over-the-shoulder restraints, shoulder or lap belts, bar, or other restraints for amusement park rides, automobiles, airplanes, trains, ski-chair lifts, and the like. Additionally, there are other applications where it is desirable to monitor proper operation of a locking or latching mechanism such as a pawl and ratchet assembly. For example, the shipping industry utilizes tie downs to secure cargo during transport by ship, train, truck, airplane, or the like, and the tie downs are secured to avoid excessive movement of the cargo when forces are applied. In these cases, pawl and ratchet assemblies may be utilized, and an operator needs to be able to trust or to verify proper engagement and operability of any biasing components. As another example, in factory environments, pawl and ratchet assemblies may be used to limit conveyor belt or other moving part motion to a single direction, e.g., a conveyor belt cannot roll backwards.

There remains an ongoing need for pawl and ratchet assemblies that operate effectively to achieve full or positive engagement between the pawl and the ratchet. Preferably, such pawl and ratchet assemblies would be relatively simple in design, would operate automatically and/or without requiring visual verification of engagement, and would be useful with restraint systems such as passenger restraints used in vehicles of amusement park rides and other vehicles.

SUMMARY

The present invention addresses the above and other problems by providing a locking mechanism or assembly with a pawl and ratchet adapted for positive engagement. The locking mechanism may have many uses with one exemplary use being in a lap bar or other passenger restraint assembly, such as with an over-the-shoulder restraint, in an amusement park ride vehicle.

More particularly, a restraint apparatus or system is provided for use in vehicles including such as ride vehicles used in theme and amusement park rides. The restraint apparatus (e.g., passenger restraint system) includes a passenger restraint such as a lap bar, a belt, or an over-the-shoulder restraint and also includes a locking mechanism for selectively latching or locking the restraint in a desired position. The locking mechanism includes a ratchet (or ratchet wheel) connected to the passenger restraint and mounted so as to rotate with movement of the passenger restraint. The locking mechanism also includes a pawl, which is a two (or more) piece assembly that includes: (1) a pivotally mounted upper portion; and (2) a pawl arm extending outward from the upper portion. In some embodiments, a first end of the pawl arm is pivotally coupled with the upper portion, and a second end of the pawl arm, distal to the first end, includes a tooth (or teeth) for engaging (typically one at a time) teeth on a surface of the ratchet wheel.

The restraint apparatus, in practice, may include a spring element applying a force onto the pawl arm urging the pawl tooth into the teeth on the surface of the ratchet wheel. Typically, the upper portion pivots about a first pivot axis, and the pawl arm pivots about a second pivot axis parallel to the first pivot axis. The pawl arm pivots about the second pivot axis independent of rotation of the upper portion about the first pivot axis.

The first end of the pawl arm may include a contact surface, and the upper portion includes a contact surface positioned to abut the contact surface of the pawl arm during the pivoting of the pawl arm. In some cases, one of the contact surfaces is nonplanar to facilitate the pawl arm and the upper portion pivoting relative to each other. The nonplanar one of the contact surfaces, for example, can be beveled from a center point at an angle (e.g., material can be removed from a planar end wall at an angle of less than about 45 degrees), whereby a gap is present on one side of the center point during the pivoting of the pawl arm relative to the upper portion of the pawl. In some embodiments, the pawl arm is coupled to the upper portion via a pivot pin extending outward from the upper portion through a recessed surface or hole in the first end of the pawl arm.

DETAILED DESCRIPTION OF THE PREFERRED EMBODIMENTS

The present description teaches a new pawl and ratchet assembly for use in latching and locking mechanisms of restraint systems to achieve positive engagement between the pawl and ratchet. Such a restraint system may be found in many implementations and applications including, but not limited to, a passenger restraint system of an amusement park ride.

Figures 1, 1A:
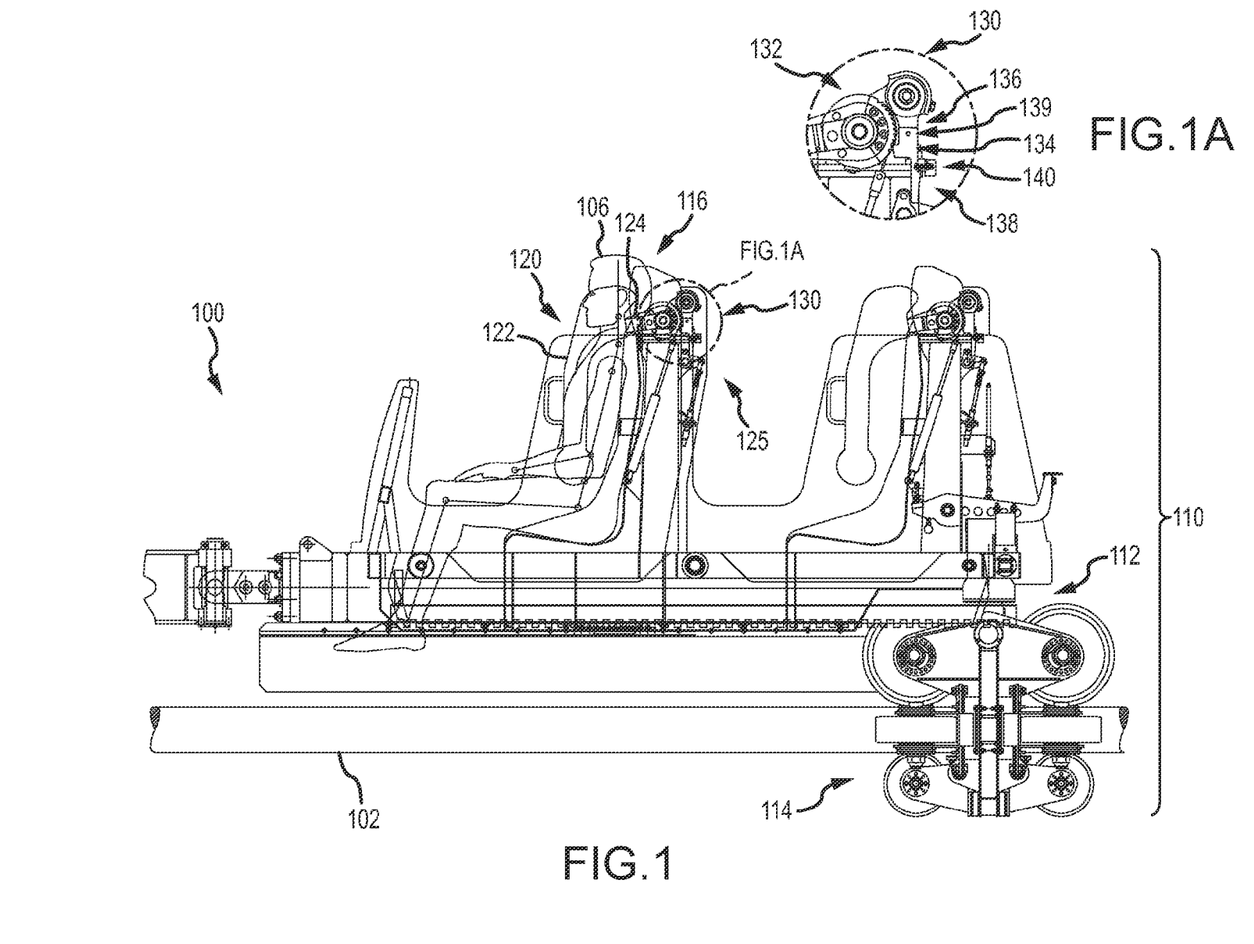
FIG. 1 shows a side view of an amusement park ride vehicle with a passenger restraint system or assembly that includes a latching and locking mechanism as described herein (e.g., with a pawl and ratchet assembly providing the latching and locking functions of the passenger restraint system)

In this regard, FIG. 1 illustrates an amusement park ride 100 that may make use of the present teaching to more safely restrain a passenger within a vehicle. The ride 100 includes a track 102 defining a ride path for the ride (e.g., a roller coaster track or the like). A passenger vehicle 110 is shown such as a car of a roller coaster train or the like in the ride 100. The passenger vehicle 110 includes a vehicle body 112 that is supported upon the track 102 so as to roll along the track with a bogie or wheel assembly 114. The passenger vehicle 110 further includes one or more seats 116 in the body/frame 112, with each seat 116 adapted to receive a passenger 106.

More significantly to this description, the ride vehicle 110 includes a passenger restraint system 120 for safely securing the passenger 106 to or within the seat 116 during operation of the ride 100, e.g., when the vehicle 110 rolls at design speeds along the track 102. The passenger restraint system 120 includes a restraint 122 that may take the form of an over-the-shoulder restraint (as shown), a lap bar, a seat belt, or other restraint that contacts passenger 106 when engaged (as shown). The restraint 122 typically can be moved away from the passenger 106 to allow the passenger 106 to leave and enter the seat 116 and, once seated, the restraint 122 can be moved to be proximate to or contacting the passenger 106, where it may be locked in place until the end of a ride operation of the ride 100. To this end, the restraint system 120 may include a connector or connecting arm 124 coupling the restraint 122 with a latching and locking mechanism 125 that is adapted to facilitate such movement of the arm 124 and restraint 122 and to also lock the arm 124 and restraint 122 in place.

As will be described in further detail below, the latching and locking mechanism 125 includes a pawl and ratchet assembly 130 facilitating movement of the connector arm 124 (and interconnected restraint 122) and then to lock the arm 124 in a position to restrain the passenger 106 in the vehicle 110. As shown, the connector arm 124 is attached to a ratchet (or ratchet wheel) 132 of the assembly 130, and the ratchet 132 is pivotally mounted in the vehicle body 112 to rotate with the movement of the connector arm 124 (e.g., when a passenger 106 pulls the restraint 122 downward toward their chest or lap).

Figure 2:
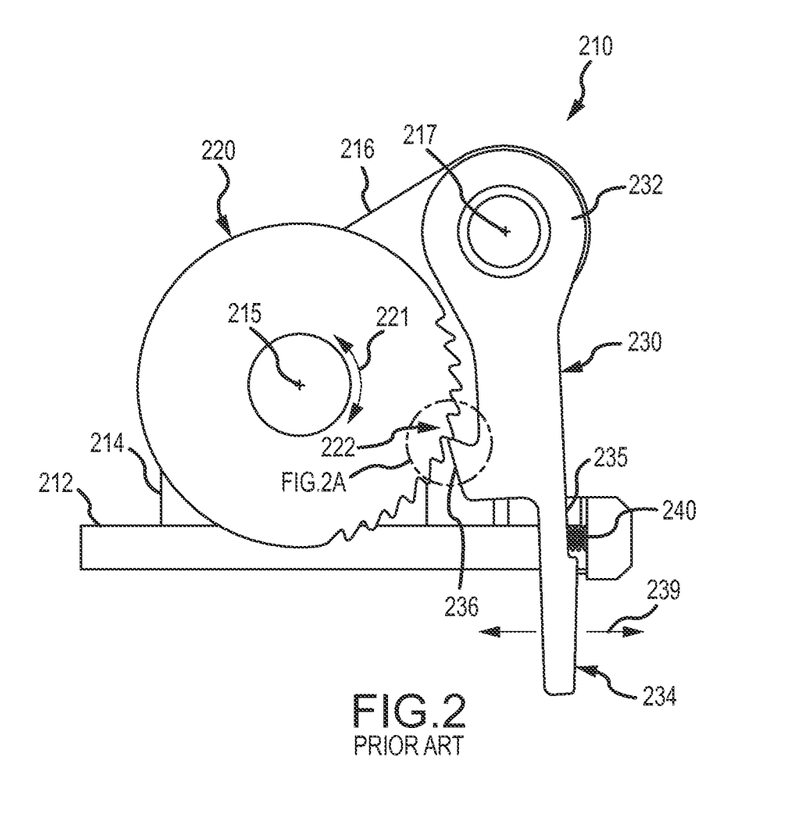
FIGS. 2 and 2A illustrate a side and an enlarged partial view, respectively, of a conventional pawl and ratchet assembly that may be used as part of a latching and locking mechanism for a restraint.

The assembly 130 further includes a pawl 134, which is a two-piece design according to the present description rather than a unitary component as found in conventional pawl and ratchet assemblies (see FIG. 2). The pawl or pawl arm 134 includes an upper section 136 pivotally mounted within the vehicle body 112 to be able to rotate in and out of engagement with the ratchet 132 (and its teeth). The pawl or pawl arm 134 further includes a lower section 138 that is pivotally mounted onto the upper section 136 such as upon pivot pin 139, which is proximate to the upper section 136 (e.g., the pin 139 may be within 1 to several inches away from the contact or mating surfaces between the upper and lower sections 136, 138 and, typically, will extend through a centrally located hole/gap/slot in the lower section (or vice versa as the pin may be provided on lower section 138 and the receiving slot/hole may be on the upper section 136).

A spring 140 such as a coil spring or other resilient member is provided to urge the lower section 138 toward the ratchet 132 (e.g., to urge the pawl tooth (or teeth) toward the valleys between the ratchet teeth). As discussed below, the two-piece pawl 134 facilitated achievement of positive engagement during the operation of the restraint system 120. In part, this functionality is achieved by allowing the lower section 138 to pivot relative to the upper section 136 such that the contact between the two pawl sections 136, 138 may vary over time or in response to tooth-to-tooth engagement between the pawl 134 and the ratchet 132 so as to avoid locking in a partially engaged configuration.

Prior to discussing the inventor's proposed pawl and ratchet assembly, it may be useful to discuss one significant problem experienced with use of conventional latching and locking mechanisms. Briefly, conventional pawl and ratchet assemblies may have issues with the tooth of the pawl becoming only partially engaged with a tooth of the ratchet. Then, in use, the ratchet and its interconnected restraint may move when enough force is applied to cause the engagement to be lost with the tooth of the pawl then more fully engaging a next tooth of the ratchet. This slipping or jerking of the ratchet may allow the restraint to loosen and/or the jerking movement can be felt by the restrained passenger, and either of these sensations can make a passenger nervous for their safety on the ride.

Figure 2A:
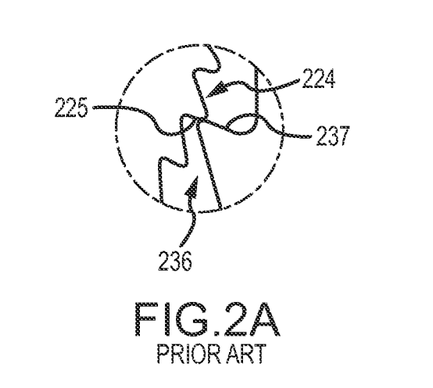

For example, FIGS. 2 and 2A illustrate a conventional pawl and ratchet assembly 210 that may be used in a vehicle of an amusement park ride. The assembly 210 includes a support frame or base 212 from which supports 214 and 216 extend or this may be a unitary member used to support both ratchet and pawl. A ratchet 220 is mounted to the support 214 so as to pivot as shown with arrow 221 about a pivot point 215. In this regard, a connector arm/element linked to a restraint typically is connected to the ratchet 220 such that movement of the restraint causes movement 221 about pivot point 215 and locking of the ratchet 220 in a particular position prevents further pivoting 221 or movement of the interconnected restraint.

A pawl 230 is included in the assembly 210 and is pivotally attached to support 216 in mounting portion 232 to rotate about pivot point 217 as shown with arrows 239. The pawl 230 has an arm portion 234 extending outward from the mounting portion 232. A pawl tooth 236 is provided on this arm portion 234 and placed proximate to an engagement or toothed section 222 of the ratchet 220. As shown, the pawl 230 is formed as a unitary member or single piece device (e.g., a single body includes arm 234 and mounting portion 232 so that these move as a unit).

A spring or other resilient member 240 is provided in the assembly 210 to apply, on an ongoing basis, a force against a contact surface 235 (opposite the pawl tooth 236) of the pawl arm 234 to urge the pawl 230 to pivot 239 about pivot point 217 so as to abut and engage with ratchet 220. In other words, the spring 240 applies a force that causes the tooth 236 of the pawl 230 to contact and engage with a tooth 224 of the ratchet 220 with FIG. 2A showing a contact surface 237 of pawl tooth 236 engaging or contacting a contact surface 225 of a ratchet tooth 225 (the contact surface 225 may also be thought of as a valley between two ratchet teeth).

In use, it is desirable that the tooth 236 fully engages with tooth 224 of the ratchet 220 such as with the full length of the tooth surface 225 contacting the pawl tooth surface 237. Such a full engagement may be considered a "positive engagement" between the pawl 230 and the ratchet 220. In FIG. 2 and as better seen in FIG. 2A, though, the assembly 210 is undesirably stuck with the ratchet 220 and pawl 230 in a partial engagement (e.g., with tooth 236 of the pawl 230 only partially contacting surface 225 of ratchet tooth 224). This is a common problem with conventional ratchet and pawl assemblies, and it may be useful to understand how the ratchet 220 and pawl 230 can become partially engaged so it will be understood how the new ratchet and pawl assemblies taught herein resolve the problem.

The partial engagement happens as the tooth 236 on the pawl 230 is contacting the surface 225 of ratchet tooth 224 and is rounding the corner on the tooth 224 of the ratchet 222. If the counter-clockwise rotation force manually applied on the ratchet 220 (e.g., a passenger is pulling the restraint attached to the ratchet 220 downward to achieve proper restraint positioning and engagement) is released at the correct spot, a restraint release force, which may be applied by an air spring or the like (not shown), that moves 221 the ratchet 220 clockwise (and attached restraint upward) takes over. The force (e.g., a lifting force on a lap bar) applied by an air spring or the like (not shown) causes friction between the pawl 230 and the ratchet 220, i.e., between teeth 224 and 236 at abutting surfaces 225, 237. The small spring 240 located on or contacting the back surface 235 of the pawl arm 234 is typically not large enough to apply a large enough urging force to overcome the friction between the teeth 224 and 236 caused by the air spring, for example. As a result, the pawl 230 remains only partially engaged as shown rather than becoming fully engaged or providing positive engagement.

Figure 3:
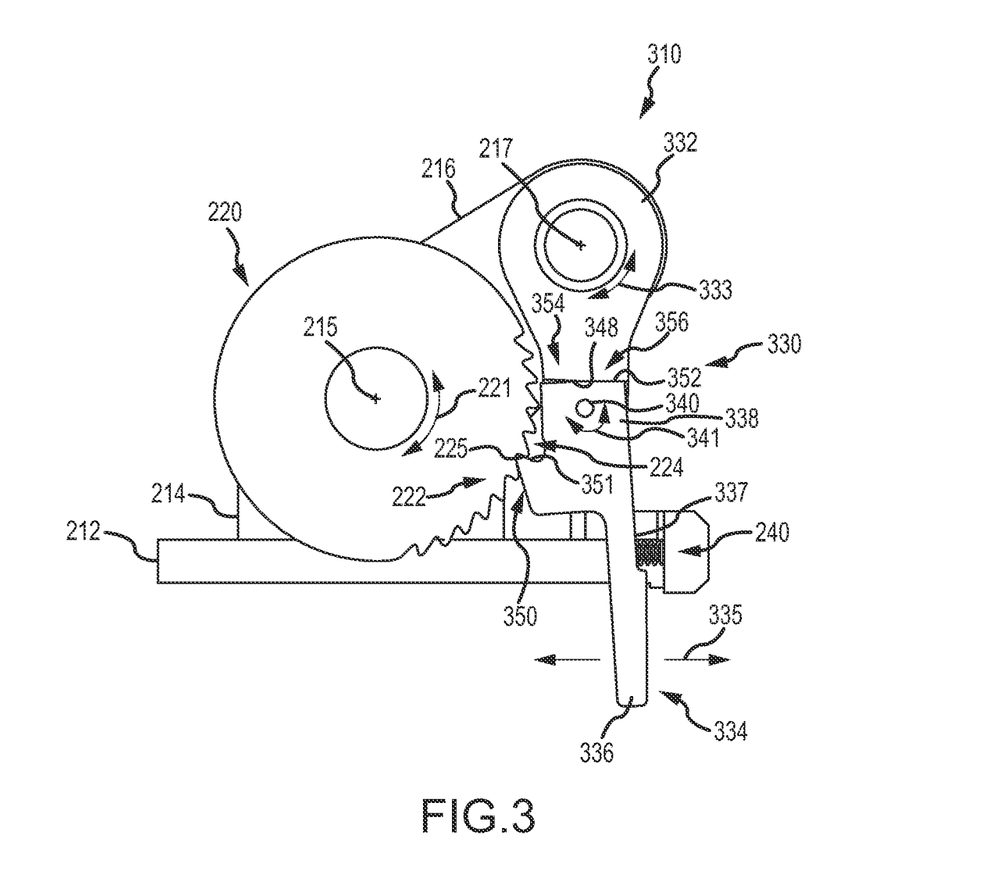
FIG. 3 illustrates a side view of one implementation of a new pawl and ratchet assembly, such as may be used in a latching and locking mechanism including the mechanism of FIG. 1, during normal operating conditions (e.g., with full/positive engagement)

FIG. 3 illustrates an improved or new pawl and ratchet assembly 310 of the present description such as may be used in the latching and locking mechanism 125 as assembly 130 to provide positive engagement. The assembly 310 may include components of assembly 210 including the ratchet 220 with its toothed or engagement portion 222, support 216, and engagement-urging spring 240.

Significantly, though, the unitary or single-bodied pawl 230 is replaced with two-piece pawl 330. The pawl 330 includes an upper portion 332 that is mounted onto support 216 so as to pivot freely about pivot point 217 as shown with arrow 333. Further, the pawl 330 includes a lower portion or arm 334 that extends from a first end 338 proximate to a lower part of portion 332 to a second end 336 distal to the pivot point 217. The end 336 pivots or moves as shown with arrow 335 with the movement of the upper portion 332 and vice versa. The spring 240 applies a force onto surface 337 of the arm 334 to urge a pawl tooth 350 and its contact surface 351 toward or into engagement with valleys of toothed portion 222 of the ratchet 220. As shown, the pawl tooth 350 is fully engaged (has positive engagement) with ratchet tooth 224 and its contact surface 225.

The first end 338 of the pawl arm 334 is pivotally coupled, with independent rotation or movement shown with arrow 341, with the portion 332 of the pawl 330. For example, as shown, a pin 340 may extend outward from the lower part of the pawl portion 332 through a hole, gap, or slot in the body or end 338 of the pawl arm 334 (note, the pivotal coupling may be achieved in other ways including having the pin 340 on end 338 of arm 334 and a hole, slot, or gap on the lower part of the portion 332 of pawl 330). In this way, the pivot axes of the ratchet 220 (through pivot point 215), the portion 332 of pawl 330 (through pivot point 217), and the pivot/mounting pin 340 (and axis extending through the pin 340) are parallel.

The pivot axis/point provided by pin 340 may be centrally located on the body of pawl arm 334 in end 338 and be located near the contact or mating areas between the lower part of pawl portion 332 and the end 338 of pawl arm 334. More specifically, the contact surfaces or end walls 348, 352 of the pawl upper portion 332 and pawl arm 334, respectively, are shown to at least partially abut/contact each other, and the pivot point provided by pin 340 for arm 334 may be proximate to the center of the contact areas of walls 348, 352 (e.g., a line extending between the pivot point 217 and the center of pin 340 may include the center of the contact region between end walls 348, 352 (or a plane containing the rotation axes of upper portion 332 and arm 334 may also include the central contact point/line between end surfaces/end walls 348, 352)). This contact region between end surfaces/walls 348, 352 typically will be equal in length and width and typically each will extend across the corresponding body (of the upper portion 332 and of the arm 334 at end 338). Also, the pivot pin 340 may be near to the end wall 352 and be centrally located (from left to right in FIG. 3) between edges/sides of the end wall 352.

The end wall or contact surface 348 on the upper portion 332 of the pawl 330 may be planar and generally orthogonal to a longitudinal axis of the upper portion 332. In contrast, though, the end wall or contact surface 352 of the arm 334 may be formed so as to either be planar but not orthogonal to a longitudinal axis of the first/upper end 338 or to be nonplanar (e.g., cut away material from one or both sides of the surface 352 relative to a center point proximate to the pin/hole 340 such as at an angle in the range of 15 to 45 degrees). In this manner, the arm 334 is able to pivot or move 341 relative to the upper portion 332 of the pawl 330 (whereas if both surfaces 348, 352 were planar and orthogonal and positioned in abutting contact along their lengths the pivoting 341 would be blocked).

In the normal operating condition shown in FIG. 3, the ratchet 220 is loaded in the clockwise condition (such as by an air spring). With the pawl 330 positively engaging the ratchet 220, the pawl tooth 350 fully engages with the ratchet tooth 224. Further, in this state and as shown, the front (or area near the ratchet 220) mating portion 354 of the pawl 330 has a gap (e.g., a space that typically is relatively small) while the rear (or area distal to the ratchet 220) mating portion 356 of the pawl 330 is closed or the surfaces 348, 352 are in full abutting contact.

Figure 4:
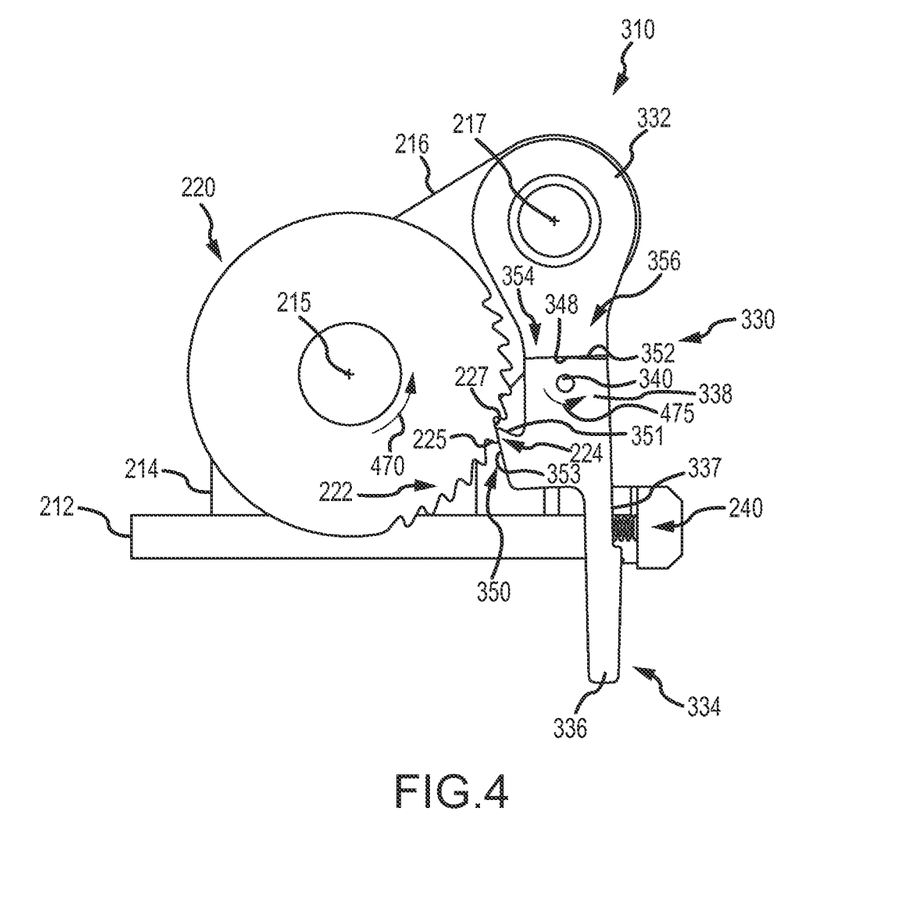
FIG. 4 illustrates another side view of the pawl and ratchet assembly of FIG. 3 during operations of an interlinked restraint system such as while a passenger is pulling the restraint linked to the pivotable ratchet downward)

Now, turning to FIG. 4, the pawl and ratchet assembly 310 is shown in a state (such as prior to the state shown in FIG. 3 with positive engagement). In this state, the ratchet 220 is being manually rotated in the counter-clockwise direction as shown with arrow 470 as may be the case when a passenger is pulling a restraint connected to the ratchet 220 downward toward their chest or lap. In other words, the passenger may be trying to tighten their restraint, and this moves the ratchet 220 as shown at 470 to try to obtain a new tooth position or with a next tooth 224 in the toothed/engagement section 222 contacting the pawl 330 at its tooth 350.

As shown, a back or non-locking (or non-engaging) surface 353 of the pawl tooth 350 is in contact with a back or non-locking (or non-engaging) surface 227 of the ratchet tooth 224 during this movement 470 of the ratchet 220. Contact forces between the teeth 224, 350 (as applied with surfaces 227 and 353) are side to side (or horizontal) in the orientation of the assembly 310 shown in FIG. 4. Further, in this state and as shown, the front (or area near the ratchet 220) mating portion 354 of the pawl 330 is closed (e.g., the surfaces 348, 352 are in full, abutting contact) while the rear (or area distal to the ratchet 220) mating portion 356 of the pawl 330 has a gap (e.g., a space that typically is relatively small).

Figure 5:
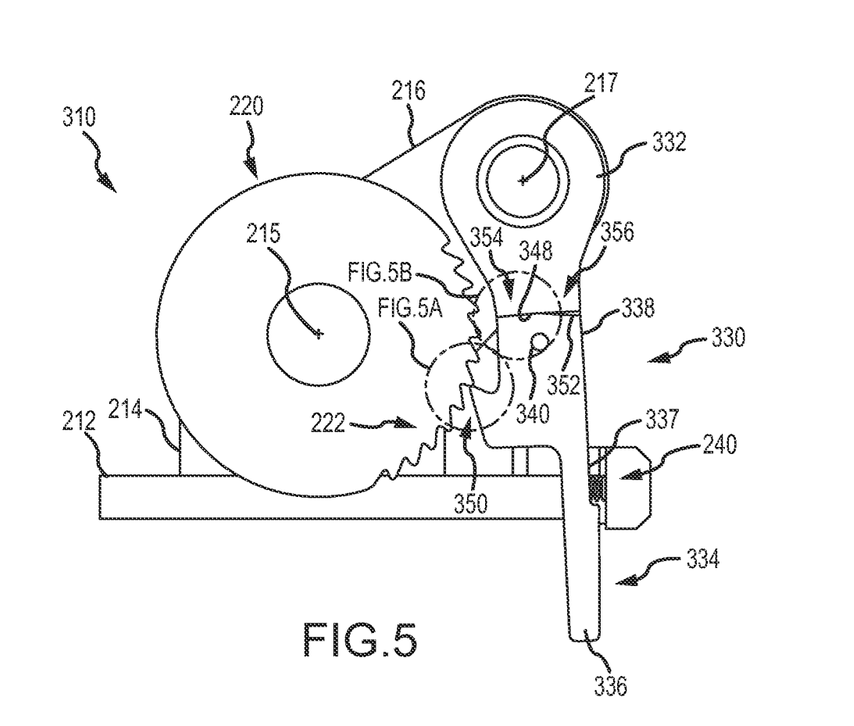
FIGS. 5, 5A, and 5B illustrate a side view and two partial enlarged views, respectively, of the pawl and ratchet assembly FIGS. 3 and 4 as the ratchet is rotated further than shown in FIG. 4 to change the tooth-to-tooth contact (e.g., initial engagement)
Figure 5A:
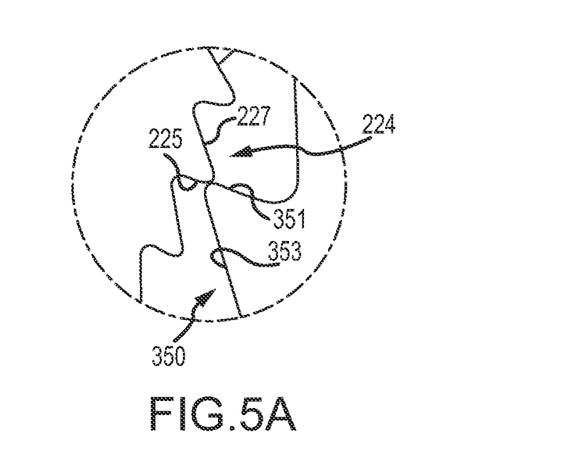
Figure 5B:
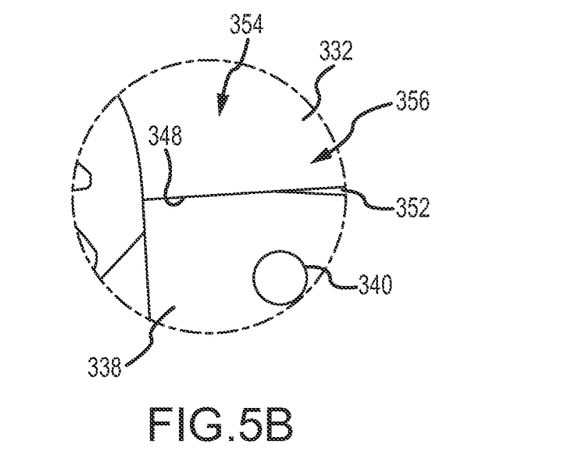

The next state of operation of the assembly 310 occurs with more rotation 470 of the ratchet 220 as shown in FIGS. 5, 5A, and 5B. The tooth 350 of the pawl 330 is "rounding the corner" of the ratchet tooth 224, and the contacting surfaces switch over to the locking or engaging surfaces 225 (of ratchet tooth 224) and 351 (of pawl tooth 350), as can be seen in more detail in FIG. 5A. The front mating portion 354 of the pawl 330 is still closed at this point while the rear mating portion 356 of the pawl 330 has a gap.

Figure 6:
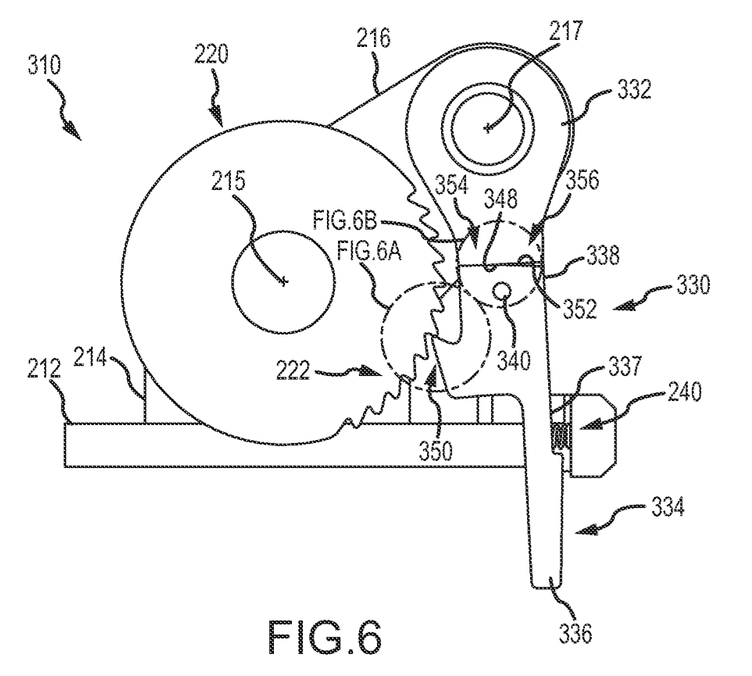
FIGS. 6, 6A, and 6B illustrate a side view and two partial enlarged views similar to those shown in FIGS. 5, 5A, and 5B but at a later time or operating state where the two-part pawl of the present description facilitated full (or fuller) tooth-to-tooth engagement (e.g., positive engagement) as described in detail herein.
Figure 6A:
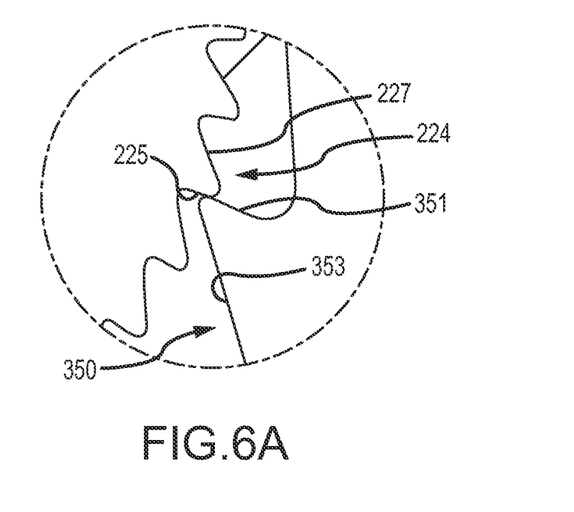

However, when the pawl tooth 350 and the ratchet tooth 224 are in this position relative to each other, the forces in the tooth-to-tooth contact change direction. This transitioning point/state can be seen in FIGS. 6, 6A, and 6B. FIG. 6A shows that the two engaging/locking surfaces 225, 351 are becoming more fully engaged or in abutting contact with further rotation of the ratchet 220 about its pivot point 215, and FIG. 6B shows that a gap is forming on the previously closed front mating portion 354 of the pawl (while the gap in the rear mating portion 356 is shrinking in size).

Figure 6B:
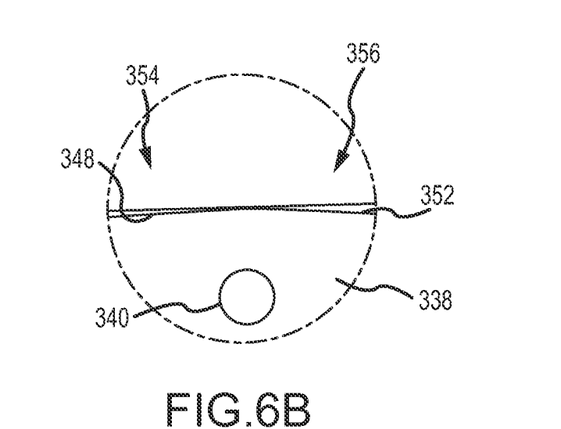

As will be understood in the operating states of assembly 310 shown in FIGS. 5-6B, the forces in the tooth-to-tooth contact are changing direction from side-to-side (horizontal) contact forces to up-and-down (vertical) contact forces. This change in direction of the contact forces between the ratchet 220 and pawl 330 causes the pawl 330 to operate (e.g., for arm 334 to rotate about pin 340, which provides pivotal mounting to upper portion 332) to create the gap in front mating portion 354 of the pawl 330. This growing gap in portion 354 of pawl 330, in turn, lowers the pawl tooth 350 (rotates the pawl tooth 350 counterclockwise in this example), which effectively avoids the undesirable condition of partial pawl engagement (partial tooth-to-tooth engagement). Note, the movement of the gaps between the end walls 348, 352 may be described as being a side of the pivot point provided by pivot pin 340 (e.g., ratchet or front side of pawl 330 and back side (or ratchet-distal side) of the pawl 330).

Figure 7A:
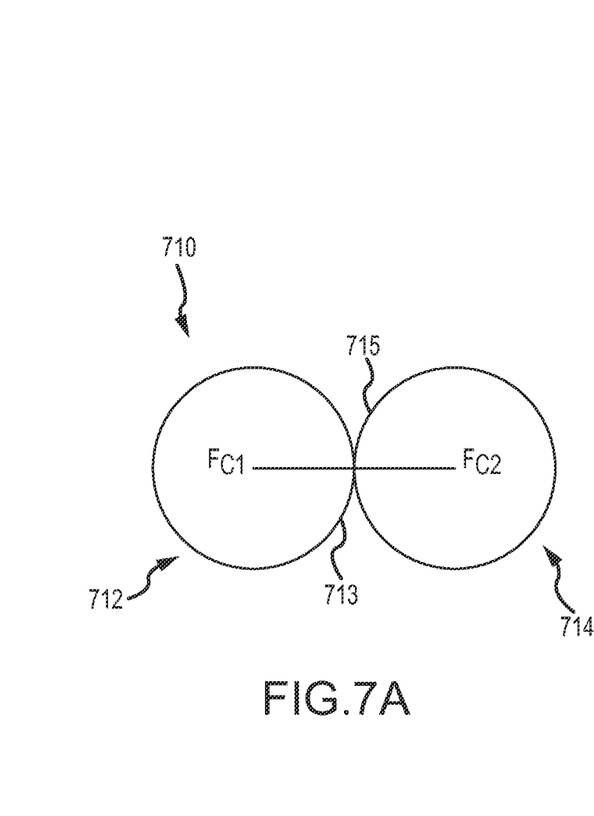
FIGS. 7A and 7B illustrate contacting teeth of a ratchet and a pawl schematically to show changes in contact or engaging forces between these components during operation of a pawl and ratchet assembly of the present description.
Figure 7B:
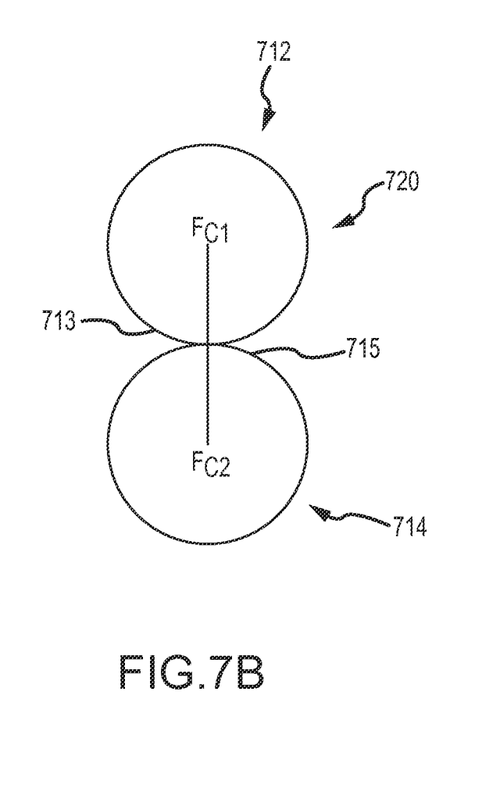

FIGS. 7A and 7B may be useful for more fully explaining the changing or movement of these tooth-to-tooth contact or ratchet and pawl contact forces. FIGS. 7A and 7B show a ratchet tooth 712 with a contact surface 713 and a pawl tooth 714 with a contact surface 715, with the teeth 712, 714 shown circular in shape for ease of explanation. Initially, as shown in FIG. 7A, the teeth 712, 714 have their contact surfaces 713, 715 abutting each other and the contact forces, $F_{C1}$ and $F_{C2}$, are oriented horizontally. Then, as shown in FIG. 7B, the ratchet with tooth 712 is rotated and the contact between surfaces 713, 715 goes from a horizontal contact to a vertical contact.

This change in direction of the contact forces, $F_{C1}$ and $F_{C2}$, between the teeth 712, 714 is what is believed to cause the change in forces in the static equations that can cause the pawl taught herein (such as pawl 330) to "buckle" or to rotate about the pivot point in the mounting pin (pin 340). Such buckling involves moving the gap or spacing between the two end walls/contact surfaces from one side of the pivot point (pin 340) to the other so as to avoid partial engagement.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

I claim:

1. A restraint apparatus for use in vehicles such as ride vehicles used in theme and amusement park rides, comprising:
   a passenger restraint; and
   a locking mechanism, comprising:
      a ratchet wheel connected to the passenger restraint and mounted to rotate with movement of the passenger restraint; and
      a pawl comprising a pivotally mounted upper portion and a pawl arm extending outward from the upper portion, wherein a first end of the pawl arm is pivotally coupled with the upper portion and wherein a second end of the pawl arm, distal to the first end, includes a tooth for engaging a plurality of teeth on a surface of the ratchet wheel,
   wherein the first end of the pawl arm comprises a contact surface,
   wherein the upper portion comprises a contact surface positioned to abut the contact surface of the pawl arm during the pivoting of the pawl arm,
   wherein one of the contact surfaces is nonplanar, and
   wherein the one of the contact surfaces that is nonplanar is beveled from a center point at an angle of less than about 45 degrees, whereby a gap is present on one side of the center point during the pivoting of the pawl arm relative to the upper portion of the pawl.

2. The restraint apparatus of claim 1, wherein the locking mechanism further comprises a spring element applying a force onto the pawl arm urging the pawl tooth into the teeth on the surface of the ratchet wheel.

3. The restraint apparatus of claim 1, wherein the upper portion pivots about a first pivot axis and wherein the pawl arm pivots about a second pivot axis parallel to the first pivot axis.

4. The restraint apparatus of claim 3, wherein the pawl arm pivots about the second pivot axis independent of rotation of the upper portion about the first pivot axis.

5. The restraint apparatus of claim 1, wherein the pawl arm is coupled to the upper portion via a pivot pin extending outward from the upper portion through a recessed surface or hole in the first end of the pawl arm.

6. A locking mechanism for passenger restraint devices, comprising:
- a ratchet for linking to a passenger restraint and mounted to rotate about a first pivot axis; and
- a pawl comprising a pivotally mounted upper portion and a pawl arm extending outward from the upper portion,
- wherein a first end of the pawl arm is pivotally coupled with the upper portion,
- wherein a second end of the pawl arm, distal to the second end, includes a tooth for engaging teeth on the ratchet,
- wherein the upper portion pivots about a second pivot axis parallel to the first pivot axis,
- wherein the pawl arm pivots about a third pivot axis spaced apart from and parallel to the second pivot axis,
- wherein the first end of the pawl arm comprises a contact surface,
- wherein the upper portion comprises a contact surface positioned to abut the contact surface of the pawl arm during the pivoting of the pawl arm,
- wherein one of the contact surfaces is nonplanar, and
- wherein the one of the contact surfaces that is nonplanar is beveled from a center point at an angle of less than about 45 degrees, whereby a gap is present on one side of the center point during the pivoting of the pawl arm relative to the upper portion of the pawl.

7. The locking mechanism of claim 6, wherein the pawl arm pivots about the third pivot axis independent of rotation of the upper portion about the second pivot axis.

8. The locking mechanism of claim 6, wherein the pawl arm is coupled to the upper portion via a pivot pin extending outward from the upper portion through a recessed surface or hole in the first end of the pawl arm.

9. The locking mechanism of claim 6, further comprising a spring element applying a force onto the pawl arm urging the pawl tooth into the teeth on the ratchet.

10. An amusement park ride, comprising:
- a vehicle track;
- a vehicle adapted for traveling on the vehicle track; and
- a passenger restraint system in the vehicle including a restraint and a locking mechanism,
- wherein the locking mechanism comprises:
  - a ratchet connected to the restraint and mounted to rotate with movement of the passenger restraint; and
  - a pawl comprising an upper portion pivotally mounted to rotate about a first pivot axis and a pawl arm extending from the upper portion, wherein a first end of the pawl arm is pivotally coupled with the upper portion to independently pivot about a second pivot axis spaced apart from the first pivot axis and wherein a second end of the pawl arm, distal to the first end, includes a tooth for engaging a plurality of teeth on a surface of the ratchet wheel,
- wherein the first end of the pawl arm comprises a contact surface,
- wherein the upper portion comprises a contact surface positioned to abut the contact surface of the pawl arm during the pivoting of the pawl arm,
- wherein one of the contact surfaces is nonplanar, and
- wherein the one of the contact surfaces that is nonplanar is beveled from a center point at an angle of less than about 45 degrees, whereby a gap is present on one side of the center point during the pivoting of the pawl arm relative to the upper portion of the pawl.

11. The ride of claim 10, wherein the locking mechanism further comprises a spring element applying a force onto the pawl arm urging the pawl tooth into the teeth on the surface of the ratchet wheel.

* * * * *